J. L. Mott,

Agricultural Boiler.

No. 296. Reissued Feb. 6. 1855.

UNITED STATES PATENT OFFICE.

JORDAN L. MOTT, OF MOTT HAVEN, NEW YORK.

IMPROVEMENT IN COMBINED CALDRON AND FURNACE.

Specification forming part of Letters Patent No. 1,873, dated December 1, 1840; extended December 1, 1851; Reissue No. 296, dated February 6, 1855.

*To all whom it may concern:*

Be it known that I, JORDAN L. MOTT, formerly of New York city, now of Mott Haven, in the county of Westchester and State of New York, have invented certain new and useful Improvements in the Mode of Constructing a Combined Caldron and Furnace for the Use of Agriculturists and others, of which the following is a full, clear, and exact description, reference being had to the accompanying drawings, making a part thereof, in which—

Figure 1:
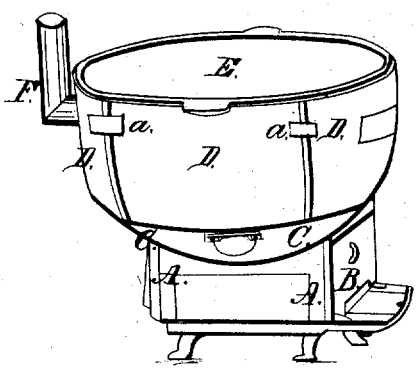
Figure 2:
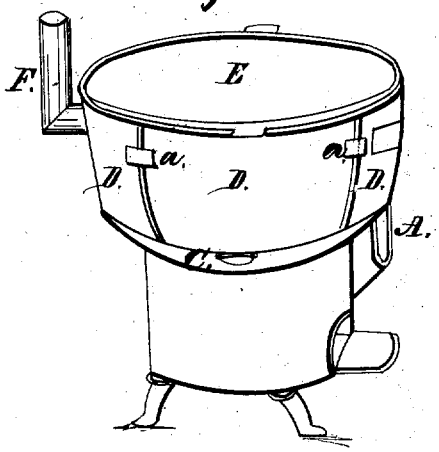
Figure 3:
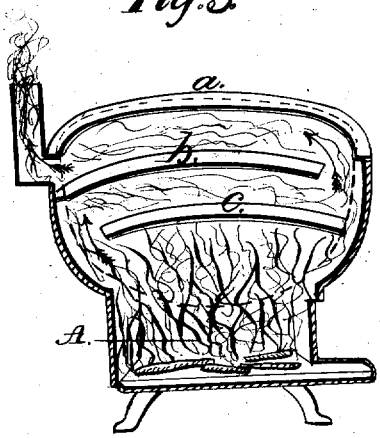
Figure 4:
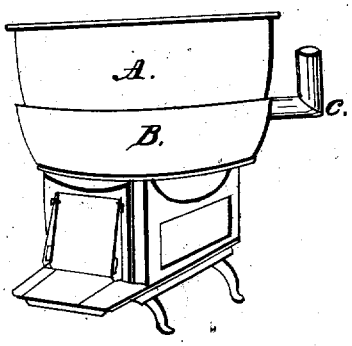

Figure 1 represents a perspective view of the combined furnace and caldron as adapted to the burning of wood. Fig. 2 represents a perspective of the same as applied to the burning of coal. Fig. 3 represents a sectional view of the furnace without the caldron, and Fig. 4 represents a perspective view of a modified from of my said improvements.

The object of my invention was the production of a portable combined furnace and caldron for the use of agriculturists and others engaged in the breeding and raising of stock, but available for all other purposes requiring the use of a portable caldron or boiler, which combined furnace and caldron should be cheap in the original construction, not liable to derangement, and economic in the use of fuel.

The nature of my invention consists, first, in combining a caldron with a furnace below of smaller size than the area of the caldron by spreading out or extending the upper part of the furnace to form an outer casing, partly or wholly surrounding the caldron, and forming a flue-space between the two leading to the exit-pipe, for the passage of the products of combustion in contact with the whole or any desired part of the surface of the caldron; and, secondly, in elevating or spreading out the sides of the furnace and fitting to and combining therewith sectional pieces fitted and secured to each other to form the outer casing of the flue-space surrounding the caldron, whereby the whole can be readily cast and put together, and at little cost.

To enable others skilled in the art to make and use my invention, I will proceed to describe the same with reference to the drawings.

The furnace which I use is similar in its general construction to that for which I obtained Letters Patent dated the 13th day of October, 1838, called the "portable furnace," which furnace was designed to receive the various kinds of utensils in ordinary use—such as pots, kettles, boilers, &c.—the flue-space between the rim of the furnace and the utensils being open all around, that heat and flame from the fire below might envelope the utensils, as in an open fire-place, and escape therefrom all around in the open air, and upon this I elevate side pieces of cast-iron, which are to surround the caldron or boiler intended to be used, these side pieces occupying the place and performing the office of the brick-work ordinarily used in the setting of caldrons, coppers, and boilers, said space standing at such a distance from the caldron as to constitute a flue-space, through which the heated air from the fire shall pass in its way to the exit-pipe. The side pieces which form the case for the larger size I cast in sections, each, in general, occupying one-fourth of the circumference of the caldron, and these sections I unite together by forming catches on the edge of one piece, which pass through a mortise on its corresponding piece, and these are secured in place by an iron wedge. Either coal or wood may be used as fuel, the furnaces being adapted to both these articles.

In the accompanying drawings, Figure 1 represents the caldron and furnace as used for wood. A is the furnace part, having a feeding-door at B. C is a part of the rim cast with the furnace, and upon the edge of which rest the side pieces or sectional plates, D D D. These clasp onto the edge of the rim, and at *a a* have the catches and mortises and wedges, by which they are held together. E is the caldron, which has a flange or rim projecting outward, and which rests on a flange or rim projecting inward from the upper edges of the sections. The space between the caldron and the side pieces may be from an inch to an inch and a quarter, or more, depending upon the size of the apparatus. F is the exit or escape pipe at the upper part of the flue-space.

Fig. 2 represents the furnace as formed for burning coal, there not being any difference between it and Fig. 1, excepting in those parts by which it is adapted to this fuel. A is a feeder, through which the coal is to be supplied, and which is to be furnished with a cover or stopper. This furnace should be lined with fire-bricks, and it will be advantageous to furnish those in which wood is used with a similar lining.

Fig. 3 is a section through the furnace and side plates, the caldron being removed, and the situation which it occupies being represented by dotted lines. A is the interior of the furnace; *a*, the rim which incloses the flue-space. *b* and *c* are projecting strips of sufficient width to occupy the flue-space, and which I sometimes cast onto the side pieces, so as to form separate flues and direct the draft, as shown by the arrows. For some purposes it may be desirable to confine the heat to the bottom portion of the boiler, and then the case rises only to the height required for the purpose, as at B in Fig. 4, and may be cast in an annular rim, A being the outside of the caldron, which fits the rim or flange on the upper edges of the said pieces, there being an exit-pipe at C.

It will be seen from the foregoing that with a furnace having a fire-chamber of small capacity to contain but a small quantity of fuel a caldron of large capacity can be heated by the passage of the products of combustion directly in contact with the whole or any desired portion of the surface of the caldron at the desire of the constructer, and that in this way a caldron can be heated with a much less quantity of fuel than when only that part of the caldron which lies over the fire-chamber receives the action of the fire, as was the case in the portable furnace of my former invention, and it will also be seen that by the mode of construction above described all the parts can be cast to fit together with comparatively little weight of metal and at little cost, thus making the whole portable, cheap, and not liable to derangement, and economical of fuel.

Having thus fully described my invention, what I claim therein as new, and desire to secure by Letters Patent, is—

1. Combining a caldron with a portable furnace having a fire-chamber of smaller size than the area of the caldron by spreading out and extending the sides of the furnace to form an outer casing partly or wholly surrounding the caldron, and forming a flue space between the two leading to the exit-pipe, substantially as and for the purpose specified.

2. Making the casing to form a flue-space around the caldron by elevating and spreading out the plates of the furnace, and fitting to and combining therewith sectional side pieces, substantially in the manner described, and for the purpose specified.

JORDAN L. MOTT.

Witnesses:
A. B. STOUGHTON,
THOMAS H. UPPERMAN.